(12) United States Patent
Lowe et al.

(10) Patent No.: US 6,419,466 B1
(45) Date of Patent: Jul. 16, 2002

(54) PUMP

(75) Inventors: Kevin G. Lowe, Virden; Robert C. Funk, Auburn, both of IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 18 days.

(21) Appl. No.: 09/603,484

(22) Filed: Jun. 23, 2000

Related U.S. Application Data (60) Provisional application No. 60/172,495, filed on Dec. 17, 1999.

(51) Int. Cl.[7] .................................................. F04B 43/08
(52) U.S. Cl. .................. 417/477.11; 417/417; 417/475; 417/53; 417/477.9
(58) Field of Search .................... 417/477.11, 477.9, 417/475, 477.12, 53

(56) References Cited

U.S. PATENT DOCUMENTS

| | | | | |
|---|---|---|---|---|
| 4,519,754 A | * | 5/1985 | Minick | 417/477 |
| 4,673,334 A | * | 6/1987 | Allington et al. | 417/475 |
| 4,717,047 A | | 1/1988 | van Overbruggen et al. | 222/207 |
| 5,096,393 A | * | 3/1992 | Van Steenderen et al. | 417/477 |
| 5,257,917 A | * | 11/1993 | Minarik et al. | 417/475 |
| 5,447,417 A | * | 9/1995 | Kuhl et al. | 417/477.11 |
| 5,846,061 A | * | 12/1998 | Ledebuhr et al. | 417/477.9 |
| 6,041,709 A | * | 3/2000 | Wells et al. | 417/475 |

FOREIGN PATENT DOCUMENTS

| | | | |
|---|---|---|---|
| FR | 2 598 182 | * | 11/1987 |
| GB | 0248653 | * | 12/1987 |

* cited by examiner

*Primary Examiner*—Charles G. Freay
*Assistant Examiner*—Michael K. Gray
(74) *Attorney, Agent, or Firm*—Barnes & Thornburg (57) ABSTRACT

A peristaltic pump for pumping a liquid, such as a juice concentrate, includes a rotor assembly attached to a housing, a band attached to the housing and surrounding at least a portion of the rotor assembly. A tube is positionable between the band and the rotor assembly. The position of the band can be adjusted relative to the rotor assembly to adjust the pressure applied to the tube by the band and the rotor assembly. The rotor assembly includes rollers therein for pumping concentrate from a reservoir by drawing a vacuum.

13 Claims, 7 Drawing Sheets

PUMP

This application claims the priority of U.S. Provisional Application Ser. No. 60/172,495, filed on December 17, 1999, and entitled "Conductance Based Control System".

BACKGROUND OF THE INVENTION

This invention is generally directed to a peristaltic pump for pumping a liquid, such as juice concentrate, from a reservoir to a dispensing head.

Prior art systems, such as the one disclosed in U.S. Pat. No. 4,717,047, provide an apparatus for pumping a liquid beverage concentrate from a reservoir to a dispensing head. The apparatus in the '047 patent uses a peristaltic pump to pump concentrate from the reservoir to the dispensing head. A tube extends from the reservoir to the dispensing head and is routed around a portion of a roller assembly. A rigid occlusion block is mounted proximate to the roller assembly forming a fixed distance between the rollers and the occlusion block. The tube is positioned between the block and the roller assembly. The position of the block is only changed to allow the tube to be inserted between the roller assembly and the block. Thereafter, the block forms a rigid structure against which the roller assembly periodically occludes the tube.

If a malfunction occurs at the dispensing head such that the dispensing head is not opened while the pump is operating, and the peristaltic pump continues to draw concentrate from the reservoir, the amount of concentrate within the tube will build up, and pressure within the tube can build up to the point where the tube fails or ruptures and leaks concentrate within the apparatus. In addition, the fixed occlusion block cannot compensate for thin or worn tubing. As the tubing wears, the output from the pump declines.

The present invention provides a novel system pump and method of pumping which prevents this problem and provides several other features and advantages over the prior art. Such features and advantages are more fully understood upon a reading of the specification in combination with a study of the drawings.

OBJECTS AND SUMMARY OF THE INVENTION

A general object of the present invention is to provide a novel peristaltic pump and method of pumping for metering a concentrate, such as a juice concentrate, from a reservoir to a dispensing head.

An object of the present invention is to provide a novel peristaltic pump and method of pumping which includes means for controllably adjusting or limiting the amount of pressure applied to a tube in which concentrate is pumped from the reservoir to the dispensing head within the system.

Another object of the present invention is to provide a novel peristaltic pump which precisely controls the amount of concentrate that is pumped and dispensed from the system.

A further object of the present invention to provide a novel peristaltic pump and method of pumping which includes means for responding to tube blockage to prevent tube failure.

Briefly, and in accordance with the foregoing, the present invention discloses a peristaltic pump for pumping a liquid, such as a juice concentrate. The peristaltic pump includes a rotor assembly attached to a housing, a band attached to the housing and surrounding at least a portion of the rotor assembly. A tube is positionable between the band and the rotor assembly. The position of the band can be adjusted relative to the rotor assembly to adjust the pressure applied to the tube by the band and the rotor assembly. The rotor assembly includes rollers therein for pumping concentrate from a reservoir by drawing a vacuum.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 7:
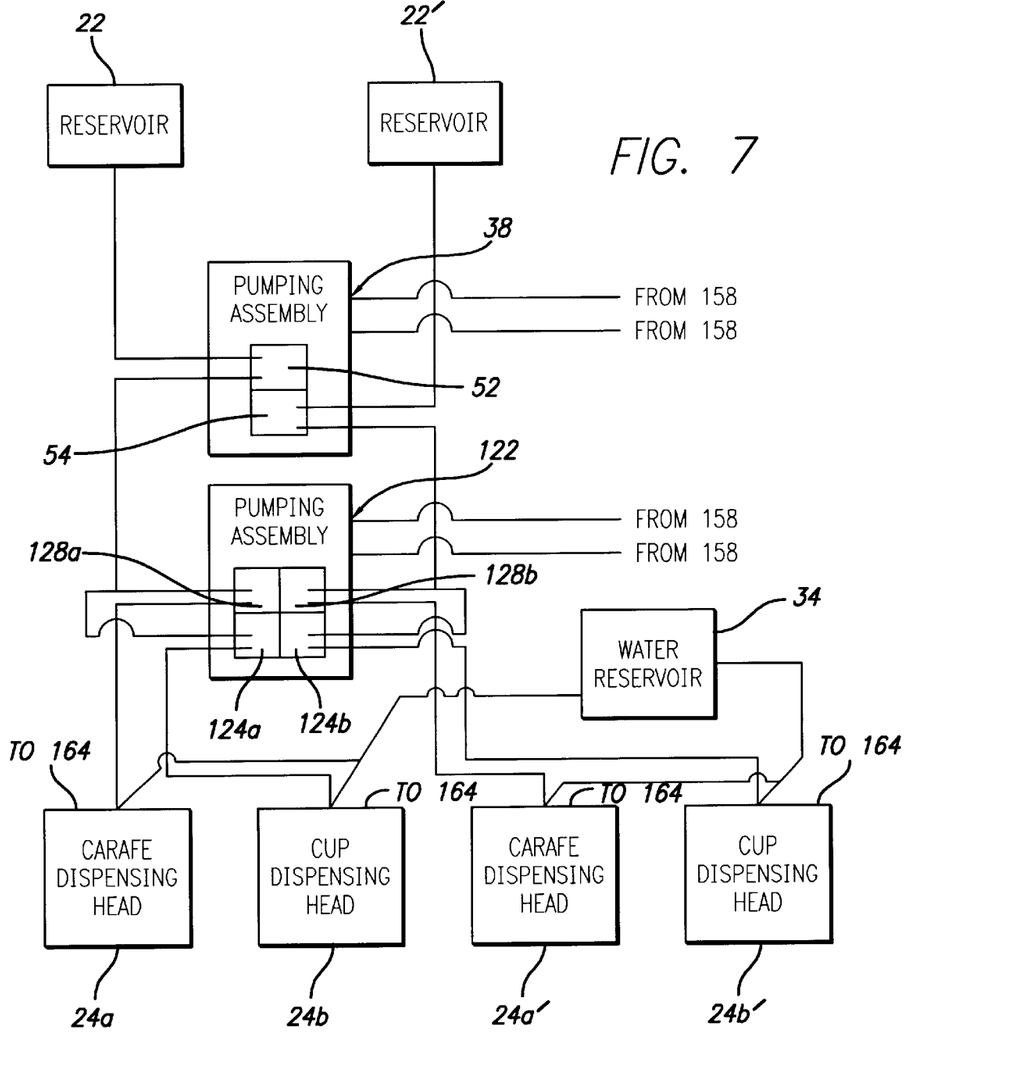
FIG. 7 is a flow chart showing the progression of juice concentrates and water through the system.

The present invention provides a novel system 20 for pumping and metering a substance, such as a liquid concentrate. For example, with reference to FIG. 7, a first type of juice concentrate is pumped from a reservoir 22 to one of a pair of dispensing heads 24a, 24b and for precisely controlling the amount of the juice concentrate that is pumped and dispensed from the system 20, and a second type of juice concentrate is pumped from a reservoir 22' to one of a pair of dispensing heads 24a', 24b' and for precisely controlling the amount of concentrate that is pumped and dispensed from the system 20. The first and second juice concentrates may be different juices, such as orange and grapefruit. The controlled amount of concentrate is mixed with a water stream at the dispensing head, for example 24b, and dispensed from the system 20 into a cup or a carafe (not shown). It is to be understood that the present system 20 can be used in a variety of applications in which a substance is to be pumped and metered.

A housing 26 having a horizontal square base 28 and a vertical central wall 30 which extends upwardly from the base 28 and is perpendicular thereto is provided for housing the system 20. Four legs 32 (only one of which is shown) are attached to the corners of the base 28. Each leg 32 has a foot attached thereto. The housing 26 further includes side walls (not shown) which project upwardly from the edges of the base 28 and a top wall (not shown) which closes the top of the housing 26. The housing 26 is not limited to that as specifically shown. Rather, it is expected that the definition of housing includes a frame or other structure or structures on which the system 20 is positioned and/or retained.

A pair of conventional dispensing heads 24a, 24b are provided on the housing 26 for dispensing the first type of juice, such as orange juice, from the system 20 as described herein. Two like conventional dispensing heads 24a', 24b' are provided on the housing 26 for dispensing the second type of juice, such as grapefruit juice, from the system 20 in a like manner. While the system 20 is discussed for dispensing first and second types of juices, it to be understood that these substances are examples of the types of substances that can be dispensed using the system 20 of the present invention. It should be understood that other concentrates, such as coffee, chocolate or other foods, such as soups, may be dispensed using this system 20. For example, regular coffee concentrate may be held in reservoir 22 and decaffeinated coffee concentrate may be held in reservoir 22'.

In the embodiment as shown, a water reservoir 34 is mounted on the base 28 on one side of the central wall 30 and a pair of concentrate reservoirs 22, 22' are provided on the other side of the central wall 30. The concentrate reservoirs 22, 22' are generally mounted on top of each other, with the lower reservoir 22 being mounted on the base 28. The lower concentrate reservoir 22 may be filled with decaffeinated concentrate and the upper reservoir 22' may be filled with regular concentrate. Of course, the invention is not limited to the specific configuration shown and should be viewed in the broadest possible terms.

Figure 1:
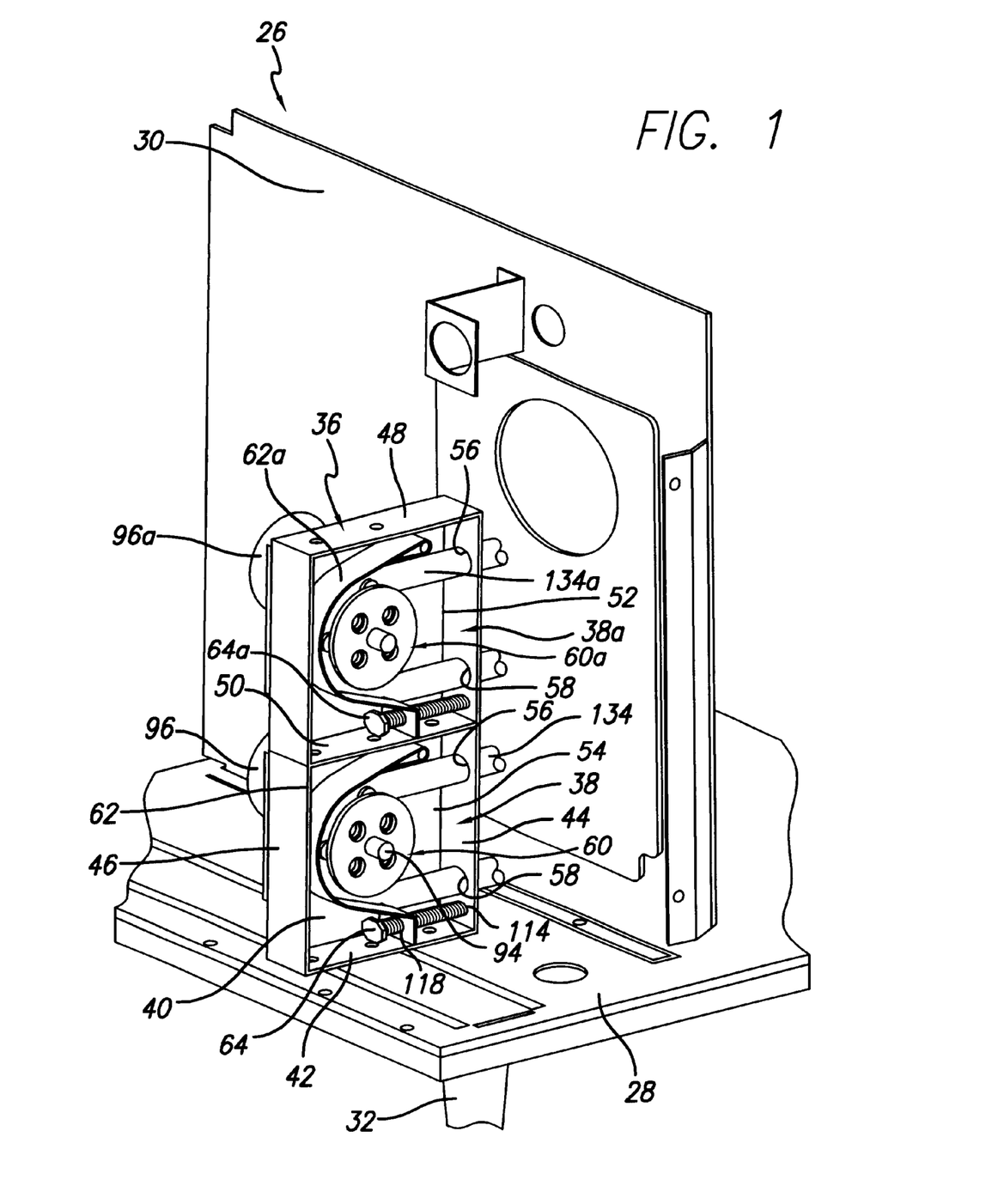
FIG. 1 is a perspective view of a portion of the system which incorporates the features of the invention, showing the pumping assembly.

Mounted proximate to the concentrate reservoirs 22, 22' is a structure 36 which houses a pair of peristaltic pumps 38, 38a. Each peristaltic pump 38, 38a is used to pump controlled amounts of concentrate from the respective reservoirs 22, 22' and is used to precisely control the amount of concentrate pumped from the reservoirs 22, 22'. As illustrated in FIG. 1, the housing 36 includes a rectangular base wall 40 which extends in a direction perpendicular to the central wall 30 and perpendicularly to the base 28. The base wall 40 is spaced a predetermined distance from the central wall 30. A bottom wall 42 is mounted at the bottom of the base wall 40, extends perpendicularly thereto, and is seated on the base 28 and attached thereto. First and second opposite side walls 44, 46 are mounted on the base wall 40 and extend perpendicularly thereto. A top wall 48 is mounted at the top of the base wall 40 and extends perpendicularly thereto. In addition, a central wall 50 is provided at the midpoint of the base wall 40. The central wall 50 divides the housing 36 into an upper chamber 52 and a lower chamber 54.

Upper and lower apertures 56, 58 are provided through the side wall 44 closest to the central wall 30 in each chamber 52, 54. In the upper chamber 52, the upper aperture 56 i provided proximate to, and below, the top wall 48, and the lower aperture 58 is provided in proximate to, and above, the central wall 50. In the lower chamber 54, the upper aperture is provided proximate to, and below, the central wall 50, and the lower aperture is provided proximate to, and above, the bottom wall 42. The purpose of these apertures 56, 58 will be described herein.

Each peristaltic pump 38, 38a includes a rotor assembly 60, 60a, an adjustable occlusion surface in the form of a displaceable band 62, 62a and means 64, 64a for adjusting the position of the respective band 62, 62a relative to the respective rotor assembly 60, 60a. The band 62, 62a is displaceable either because the band 62, 62a is semi-rigid and provides a degree of flexion, because the band 62, 62a is spring-loaded, or both. The preferred embodiment as shown includes both. One peristaltic pump 38 is mounted within the lower chamber 54. The other peristaltic pump 38a is mounted within the upper chamber 52. Each peristaltic pump 38, 38a, is identical, and, as such, one peristaltic pump 38 is described herein with the understanding that the other peristaltic pump 38a is identical in construction and function.

Figure 6:
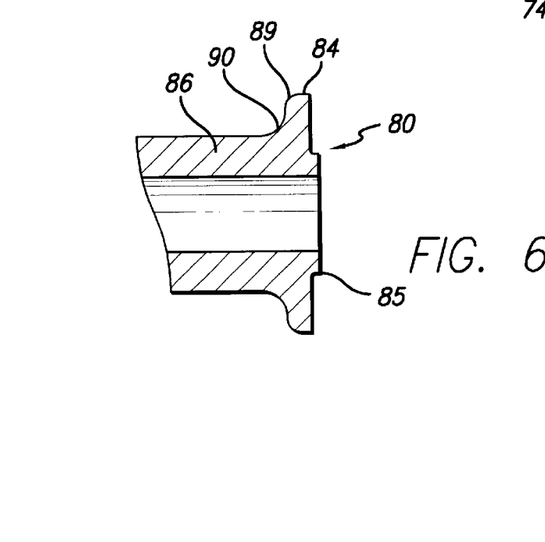
FIG. 6 is a cross-sectional view of a portion of one of the rollers in the rotor assembly.

Four spindled rollers 80 are attached between the plates 68, 70. Each roller 80 is made of a suitable material, such as plastic. Each roller 80 is mounted between the plates 68, 70 by a rod 82 which extends into respective recessed bosses 72 on each plate 68, 70. As such, each roller 80 is rotatable with respect to the plates 68, 70. Each roller 80 is a one-piece member and includes a pair of outer portions 84 with a cylindrical central portion 86 therebetween. An end portion 85 is provided on the outer surface of each outer portion 84. Each outer portion 84 has predetermined diameter which is greater than a predetermined diameter of the central portion 86. Each end portion 85 has a predetermined diameter which is less than the diameter of the central portion 86. Each outer portion 84 has an inner curved surface 89 which smoothly transitions with a curved surface 90 between the central potion 86 and the outer portion 84, see FIG. 6. The spool-shape of the rollers 80 tend to cause the tube 134 which the rollers 80 abut to be centered against the band 62 to prevent the tube 134 from being pinched between the roller 80 and the band 62. Whereas in the prior art the surface of the roller was angular, a round tube would become deformed as a result of being pressed against that angular surface. Such deformity would cause cutting or chaffing resulting in damage to the tube. The smooth transition of the surface of the roller 80 allows the tube 134 to be held in place without such damage. A plate (not shown) can be provided between the side wall 44 and the rotor assembly 60 and between the portions of the tube 134 between the side wall 44 and the rotor assembly 60 to ensure the correct placement of the tube 134.

When the rollers 80 are assembled with the plates 68, 70, an outermost extent of each outer portion 84 falls along a common circle having a predetermined diameter. The diameter of this common circle is greater than the diameter of the plates 68, 70. In addition, the outermost extent of each central portion 86 falls along a common circle having a predetermined diameter. The diameter of this common circle is less than the diameter of the plates 68, 70. The plates 68, 70, rollers 74 and rods 82 are held together by suitable means, such as rivets 92, which extend through the apertures 78 in the bosses 74 The end portions 85 can bear against the plates 68, 70 and act as thrust bearings. As such, if any of the rollers 80 bear against the plates 68, 70, only the end portions 85 rub thereagainst, instead of bearing against the outer portions 84 of the rollers 80, thereby minimizing the amount of drag created by the rollers 80.

A gear motor shaft 94 extends through the central passageways 76 of the plates 68, 70 and mounts the plates 68, 70, rollers 80 and rods 82 on one side of the base wall 40 and generally in the center of the chamber 54. The gear motor shaft 94 extends through an aperture provided through the base wall 40 and protrudes from the opposite side thereof. A motor 96 is attached to the housing 66 proximate to the rotor assembly 60 and is coupled to the end of the gear motor shaft 94 which protrudes from the opposite side of the base wall 40. When operated, the motor 96 drives and rotates the rotor assembly 60 as described herein.

The band 62 is positioned in close proximity to and partially surrounding a portion of the rotor assembly 60 and is generally positioned on an opposite side of the apertures 56, 58. A first end 98 of the band 62 is affixed to the base wall 40 and a second end 100 is coupled with the adjusting means 64. The band 62 is formed of a suitable material, such as metal, or plastic having rigid yet flexible characteristics. The band 62 includes a curved portion 102 and a straight portion 104. The curved portion 102 generally conforms to the outer shape of the rotor assembly 60. The straight portion 104 is at the second end of the band 62 to cooperate with the adjusting means 64.

The first end 98 of the band 62 is pivotally mounted by suitable means, such as a post axle or rivet 106, to an upper portion of the base wall 40 proximate to, but spaced from, the upper aperture 56. The first end 98 of the band 62 may be doubled over to generally surround the post 106, with the doubled over end being welded to the curved portion 102 of the band 62. As described below, a degree of rotation is provided between the first end 98 and the post 106 to provide enhanced flexibility of the band 62.

The straight second end 104 of the band 62 is attached to the adjusting means 64 As shown in the drawings, the adjusting means 64 includes a threaded member 108 having a head 110 and a threaded shank 112 extending therefrom. The free end of the shank 112 extends through an aperture 114 in the side wall 112 which is below the lower aperture 58. The free end of the shank 112 is threadedly engaged with a female member 116, such as a nut attached to the wall 44.

The straight second end 104 of the band 62 is attached to the shank 112 between the head 110 of the threaded member 108 and the side wall 44. The shank 112 extends through an aperture 118 provided in the straight portion 104 of the band 62. A spring 120, which has a constant spring force, is provided between, and bears against, the head 110 of the threaded member 108 and the straight portion 104 of the band 62.

The occlusion force created by the rotor assembly 60 and the band 62 compressing the tube 134 therebetween can be controllably adjusted by operation of the adjusting means 64. To increase the occlusion force, the fastener 108 is moved such that the length of the shank 112 within the chamber 54 is shortened and the threaded member 108 is thereafter secured in place. In other words, the curved portion 102 of the band 62 is drawn closer to the rotor assembly 60 decreasing the space between the band 62 and the rotor assembly 60. Conversely, to decrease the occlusion force, the threaded member 108 is moved such that the length of the shank 112 within the chamber 54 is lengthened. In other words, the curved portion 102 of the band 62 is moved away from the rotor assembly 60 increasing the space between the band 62 and the rotor assembly 60.

The constant spring force generated by the spring 120 provides a degree of displacement or expandability of the band 62 relative to the rotor assembly 60. This degree of displaceability allows the peristaltic pump 38 to flex or respond to variations in wall thickness of the tube 134, roller diameter, substance viscosity, internal pressures and the like. The band 62 compensates for wear on the tube 134 and reduced over occlusion. In addition, if the head becomes blocked, the substance being pumped backs up in the tube 134 Since the tube 134 is blocked, the substance cannot exit and tends to pressurize the tube 134. The pressurized tube 134 resists further peristaltic action by the rotor assembly 60 since the tube 134 generally can no longer be occluded between the rotor assembly 60 and the band 62. However, because the spring 120 is provided on the adjusting means 64, the spring 120 can be compressed which allows the band 62 to move away from the tube 134 and the rotor assembly 60. The displaceability of the band 62 as a result of the spring 120 reduces the occlusion force on the tube 134 thereby reducing the risk of tube rupture or failure.

Figure 11:
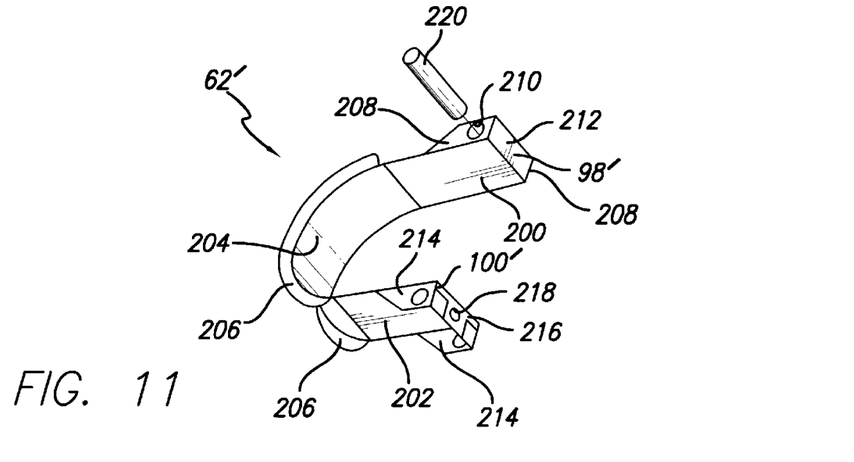
FIG. 11 is a perspective view of an alternate band which can be used in the system of the present invention.

Attention is now directed to FIG. 11 which shows an alternate adjustable occlusion surface or semi-rigid band 62' that can be substituted for band 62, 62a. Like band 62, 62a, band 62' is positioned in close proximity to and partially surrounds a portion of the rotor assembly 60 and is generally positioned on an opposite side of the apertures 56, 58. A first end 98' of the band 62' is mounted on the base wall 40 and a second end 100' is coupled with the adjusting means 64. The band 62 is formed of a suitable material, such as metal or plastic having rigid yet flexible characteristics. The band 62' includes a straight first end portion 200 at one end thereof, a straight second end portion 202 at the other end thereof, and a curved portion 204 connecting the first and second straight portions 200, 202 together. The curved portion 204 generally conforms to the outer shape of the rotor assembly 60. Stiffening ribs 206 are provided on the curved portion 204.

The first end 98' of the band 62' has a pair of side flanges 208, each of which extends perpendicularly from the respective side edges of the first end portion 200 and in a direction opposite to the second end portion 202 of the band 62'. An aperture 210 extends through each side flange 208. An end flange 212 extends perpendicularly from the end edge of the first end portion 200.

The second end 100' of the band 62' has a pair of side flanges 214, each of which extends perpendicularly from the respective side edge of the second end portion 202 and in a direction opposite to the first end portion 200 of the band 62'. An end flange 216 extends perpendicularly from the end edge of the second end portion 202. An aperture 218 extends through the end flange 216.

The first end 98' of the band 62' is pivotally mounted to the base wall 40 by a pivot member 220, such as a dowel rod, which extends through the apertures 210 through the side flanges 210. The first end 98' is mounted to an upper portion of the base wall 40 proximate to, but spaced from, the upper aperture 56. The degree of rotation provided between the first end 98' and the pivot member 220 provide for enhanced flexibility of the band 62'.

The end flange 216 on the second end portion 202 of the band 62' is attached to the adjusting means 64. The second end portion 202 of the band 62' is attached to the shank 112 between the head 110 of the threaded member 108 and the side wall 44. The shank 112 extends through the aperture 218 provided in the end flange 216. The spring 120, which has a constant spring force, is provided between, and bears against, the head 110 of the threaded member 108 and the end flange 216.

The occlusion force created by the rotor assembly 60 and the band 62' compressing the tube 134 therebetween can be controllably adjusted by operation of the adjusting means 64. To increase the occlusion force, the fastener 108 is moved such that the length of the shank 112 within the chamber 54 is shortened and the threaded member 108 is thereafter secured in place. In other words, the curved portion 204 of the band 62' is drawn closer to the rotor assembly 60 decreasing the space between the band 62' and the rotor assembly 60. Conversely, to decrease the occlusion force, the threaded member 108 is moved such that the length of the shank 112 within the chamber 54 is lengthened. In other words, the curved portion 204 of the band 62' is moved away from the rotor assembly 60 increasing the space between the band 62' and the rotor assembly 60.

The constant spring force generated by the spring 120 provides a degree of displacement or expandability of the band 62' relative to the rotor assembly 60. This degree of displaceability allows the peristaltic pump 38 to flex or respond to variations in wall thickness of the tube 134, roller 80 diameter, substance viscosity, internal pressures and the like. The band 62' compensates for wear on the tube 134 and reduced over occlusion. In addition, if the head becomes blocked, the substance being pumped backs up in the tube 134. Since the tube 134 is blocked, the substance cannot exit and tends to pressurize the tube 134. The pressurized tube 134 resists further peristaltic action by the rotor assembly 60 since the tube 134 generally can no longer be occluded between the rotor assembly 60 and the band 62'. However, because the spring 120 is provided on the adjusting means 64, the spring 120 can be compressed which allows the band 62' to move away from the tube 134 and the rotor assembly 60. The displaceability of the band 62' as a result of the spring 120 reduces the occlusion force on the tube 134 thereby reducing the risk of tube rupture or failure.

Figure 2:
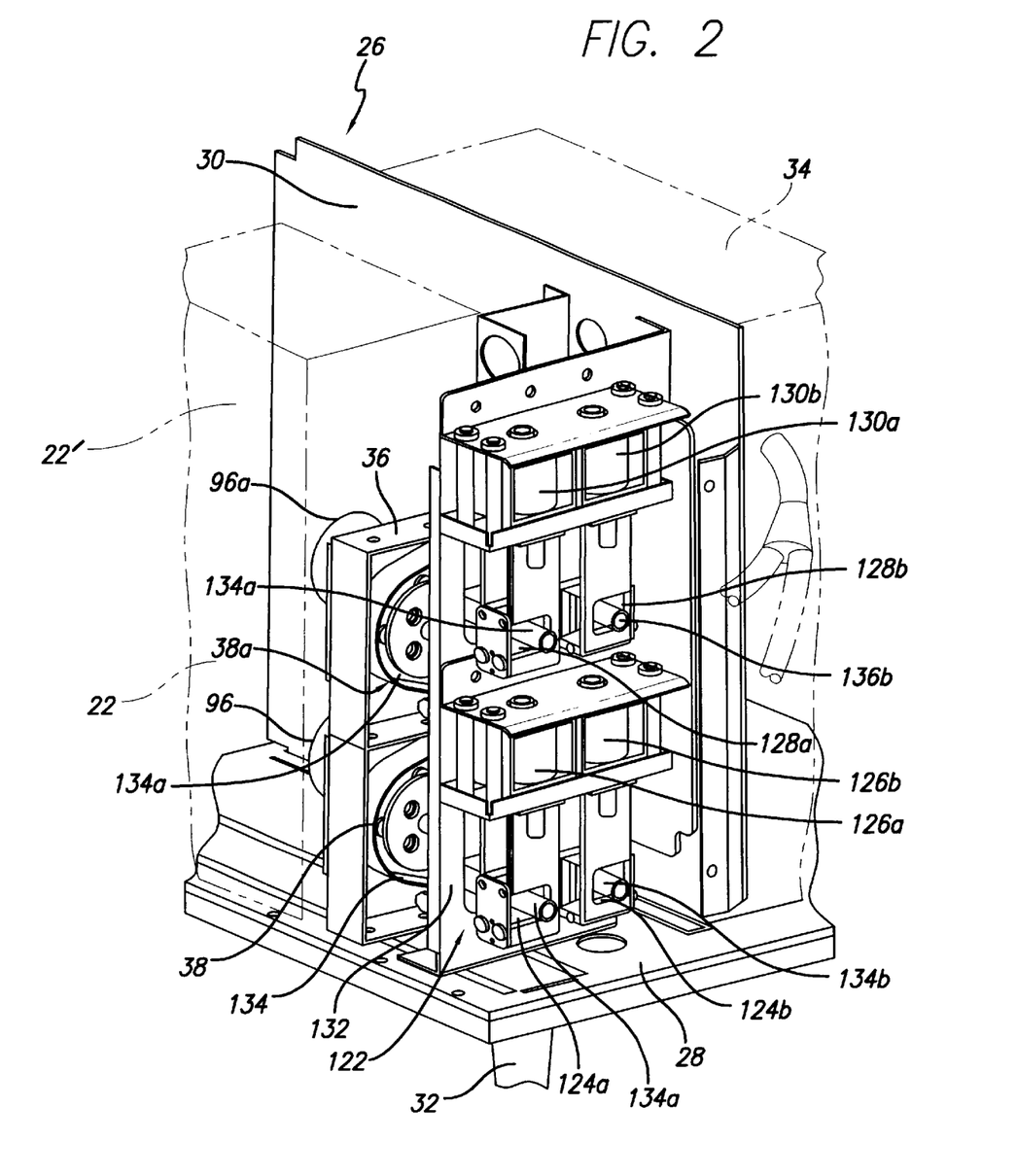
FIG. 2 is another perspective view of a portion of the system which incorporates the features of the invention, showing the pumping assembly and the gating assembly.
Figure 3:
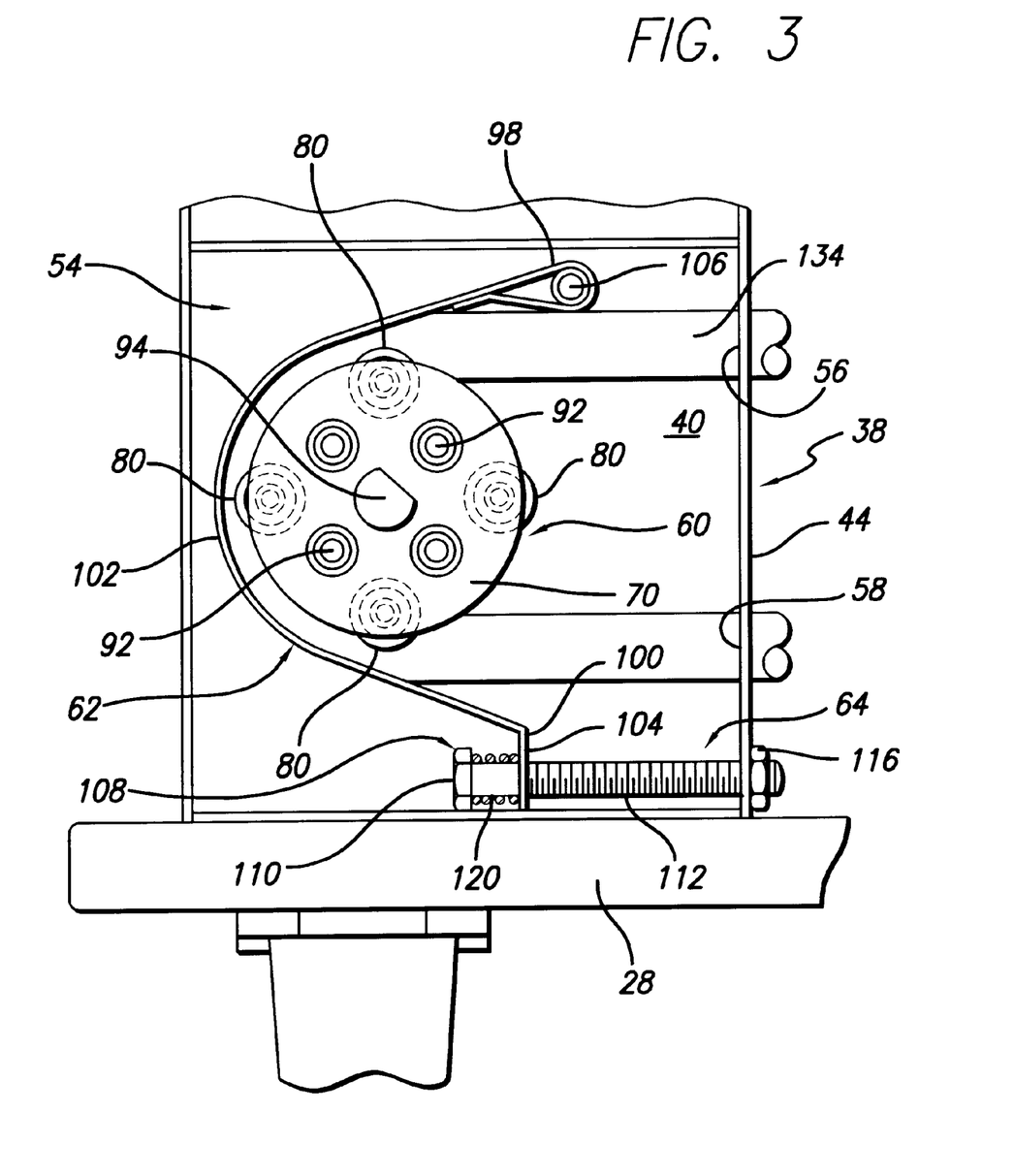
FIG. 3 is a side elevational view of a portion of the pumping assembly.
Figure 4:
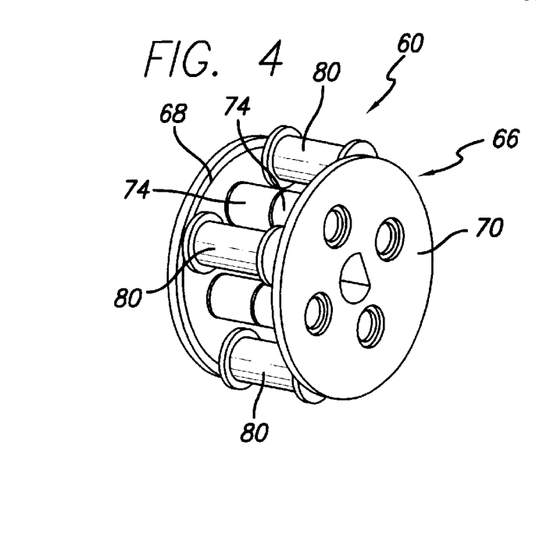
FIG. 4 is an assembled perspective view of a rotor assembly.
Figure 5:
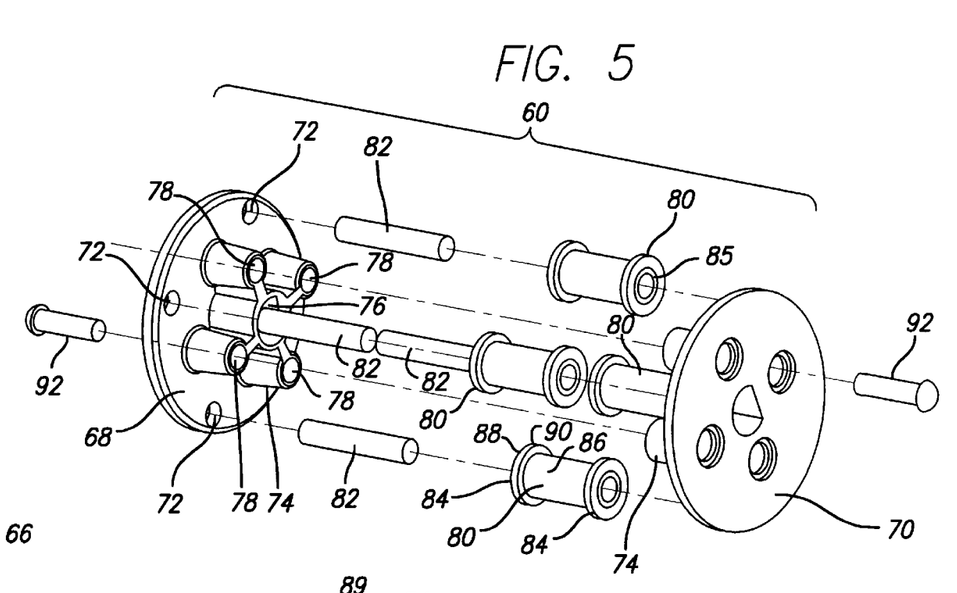
FIG. 5 is an exploded perspective view of the rotor assembly.

A gating assembly 122, see FIG. 2, is also provided with the present system 20. The gating assembly 122 includes a pair of lower gate devices 124a, 124b, each of which is activated by a respective solenoid 126a, 126b, and a pair of upper gate devices 128a, 128b, each of which is activated by a respective solenoid 130a, 130b. The gate devices 124a, 124b; 128a, 128b and the solenoids 126a, 126b, 130a, 130b are mounted on a wall 132. The wall 132 extends perpendicularly to the base 28, is secured thereto and extends perpendicularly to the central wall 30 and is secured thereto.

A pair of flexible tubes 134, 134a are provided for routing concentrate from the respective concentrate reservoir 22, 22', and through the respective peristaltic pumps 38, 38a. The tubes 134, 134a are made from a flexible material. If used in the food industry, the tubes 134, 134a are made from a flexible material which satisfy applicable food quality material sanitation standards. The tubes 134, 134a can be made of suitable silicone or other suitable material. The material of which the tube 134, 134a is made of must be able to be to withstand repeated flexing of the peristaltic pumps 38, 38a and gate devices 124a, 124b, 128a, 128b without cracking or splitting. The tubes 134, 134a must also be able to withstand the occlusion forces created by the peristaltic pumps 38, 38a and gate devices 124a, 124b, 128a, 128b. Each tube 134, 134a is routed in the same manner and, as such, the routing of only tube 134 is described from the reservoir 22, through the peristaltic pump 38, through the gating assembly 122 to the dispensing heads 24a, 24b, with the understanding that the routing of tube 134a from the reservoir 22', through the peristaltic pump 38a, through the gating assembly 122 to the dispensing heads 24a', 24b' is identical.

The tube 134 is attached to the reservoir 22 by suitable means. The tube 134 extends from the reservoir 22 and through the upper aperture 56 to enter the chamber 54. The tube 134 is securely anchored to the wall 44 proximate to the upper aperture 56 by suitable means. The tube 134 then extends around the rotor assembly 60 between the rollers 80 and the band 62. The tube 134 exits from between the rotor assembly 60 and the band 62 and exits the chamber 54 through the lower aperture 58. When the tube 134 is between the rollers 80 and the band 62, the tube 134 sits against the central portion 86 of the rollers 80.

The tube 134 is then split into first and second portions 134a, 134b (tube 134 is split into first and second portions 134a, 134b ) by suitable means, such as a Y-fitting gate or a T-fitting gate, and the first portion 134a extends through one gate device 124a and the second portion 134b extends through the other gate device 124b. Thereafter, the first and second portions 134a, 134b are routed to respective dispensing heads 24a, 24b at which point the concentrate is mixed with a water stream which is pumped from the water reservoir 34, and dispensed from the system 20.

A feedback device 150 is also provided with the present system 20 at each dispensing head 24a, 24b; 24a', 24b' and is coupled to a controller 158, described herein. The feedback device 150 monitors at least one characteristic of the dispensed product, its components, or both, and determines whether an adjustment of the amount of concentrate is needed. The feedback device 150 may be electrical, such as a conductance-based system, optical or an other characteristic sensing system.

Figure 8:
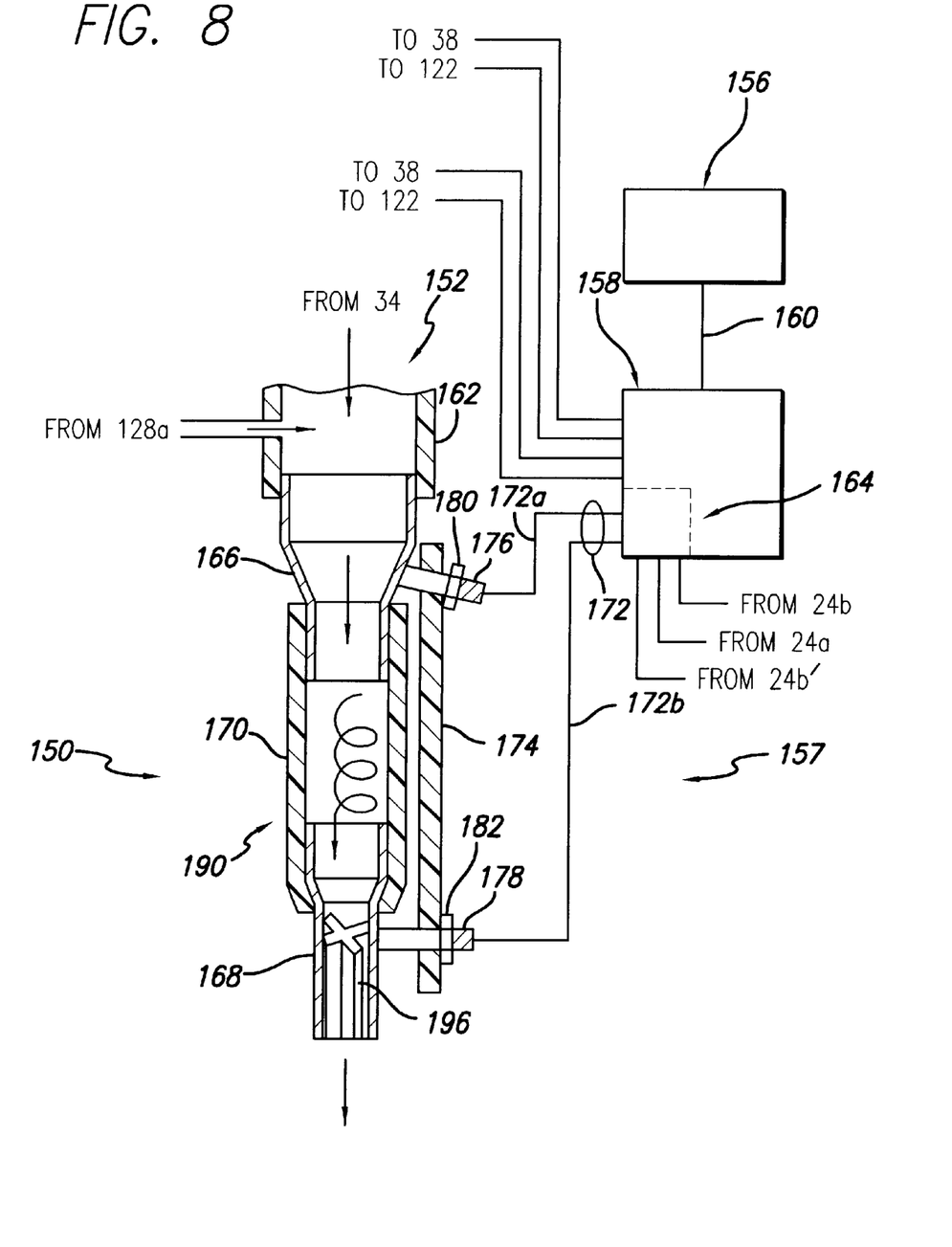
FIG. 8 is a diagrammatic illustration of a conductivity sensor assembly which forms part of the system.

An example of the feedback device 150 is shown FIG. 8 in which the feedback device 150 is shown diagrammatically and includes a novel dilution assembly 152 using a novel conductance sensor 154. FIG. 8 shows the feedback device 150 associated with dispensing head 24a, with the understanding that the respective conductance sensor assemblies associated with dispensing heads 24b, 24a', 24b' are identically formed and are operated in the same manner. The dilution assembly 152 is coupled to the gating assembly 128a and the water reservoir 34.

An interface 156 is provided in the system 20. The interface 156 may be as uncomplicated as on/off switches or may involve a detailed computer based user-interface selections. Regardless of its simplicity or complexity, the interface 156 is coupled to the controller 158 which controls the system 20 in response to inputs from the interface 156. The controller 158 is coupled to the water reservoir 34, the peristaltic pump 38, the gating assembly 122, and each conductance sensor 154. When the interface 156 is activated, a signal 160 is transmitted to the controller 158. The controller 158 then responds to the signal 160 and controllably operates the peristaltic pump 38 and/or the gating assembly 122 to dispense a pre-determined quantity of concentrate into the dilution assembly 152. One of ordinary skill in the art will appreciate that appropriate connections, couplings or conduits are provided to permit the water reservoir 34 to communicate with a corresponding chamber 162 of the dilution assembly 152. The concentrate and the water are mixed in the chamber 162 to produce a desired resultant beverage.

The conductance sensor 154 is coupled to the chamber 162, generally downstream from the initial mixing of the concentrate and the water. The conductance sensor 154 includes two spaced-apart contacts or probes in the form of a first cylindrical electrode 166 and a second cylindrical electrode 168. The electrodes 166, 168 are spaced apart by a non-conductive or dielectric portion 170 such as a silicone tube. The electrodes 166, 168 are connected to a conductivity sensing circuit 164 of the controller 158 by line 172.

As shown in FIG. 8, a spacer 174 of a dielectric material is provided to space apart the electrodes 166, 168. Conductive threaded studs 176, 178 are provided on the respective electrodes 166, 168 and are attached to the spacer 174 with nuts 180, 182. Lines 172a, 172b (which together form line 172) are attached to the conductive studs 176, 178.

Continuing the dispensing of a resultant beverage as initially discussed above, the conductivity sensing circuit 164 provides conductance measurements of the resultant beverage during the dispensing of the desired quantity of beverage. In this regard, the conductance of the resultant beverage can be used to adjust the dispensing of the concentrate from the corresponding dispenser 22 to maintain the conductance of the resultant beverage within a desired range. The signals from the lines 172a, 172b are processed by the controller 158 which then makes adjustments to the operation of the peristaltic pump 38, such as adjusting the rate of rotation of the peristaltic pump 38, and/or the operation of the gate device 128a, such as adjusting the rate of the opening and closing of the gate device 128a, throughout the beverage production cycle. The adjustment of the operation of she peristaltic pump 38 and/or the operation of the gate device 128a throughout the beverage dispensing cycle helps to increase the consistency, repeatably, uniformity and accuracy of the concentration of the concentrate in the dilution substance.

A time-metered or volume-metered quantity of heated water may be dispensed from the water reservoir 34. The closed-loop system improves the consistency of the resultant beverage by accurately controlling the dispensing of concentrate into the hot water stream. The conductance sensing circuit 164 and the controller 158 calculate the conductance to determine the concentration of the resultant beverage and provide controlled variation of the dispensing rate of the concentrate into the chamber 163.

The controller 158 is pre-programmed with information about the control of the peristaltic pump 38 and of the gate device 128a so that when a specific conductivity is sensed by the conductance sensor 154, if necessary, adjustment of the operation of the peristaltic pump 38 and/or the operation of the gate device 128a can be made in response thereto. Independent control of the peristaltic pump 38 and of the gate device 128a may provide more accurate control. The system 20 monitors conductance of the concentrate "on the fly" and allows the adjusting of the peristaltic pump 28 and/or the gate device 128a to precisely control the amount of concentrate mixed with the dilution stream. Controlling the flow of the substance through the gate device 128a tends to reduce or eliminate the "pulsing" of substance through the conduit thereby providing a more uniform flow. This will increase the uniformity of the mixture with the heated water and dispensing of a consistent beverage from the exit port of the dilution assembly 152. This reinforces and enhances the visual characteristics of the brewed beverage to the consumer.

While control of the concentrate amount has been described, control of the water dispensed from the water reservoir 34 can also be effected using the controller 158.

The feedback device 150 helps to adjust the system 20 to assure consistent blend strength since the conductivity of the beverage is related to the blend strength. For example, the concentrate in combination with the water is much more conductive than the water prior to mixing with concentrate.

The conductivity sensing circuit 164 is capable of sensing the conductance of various substances and can be adjusted for the type of substance being dispensed. The conductance reading or measurement is used as a characteristic of the concentrate in the resultant beverage. For example in juice products, the conductance measurement is related to the acids in the juice. Also, in coffee, the conductivity measurement is related to the caffeine, acid, and solids (total dissolved solids) in the coffee concentrate. Of course, the feedback device 150 can be adjusted based on the type of concentrate used in the characteristics of the concentrate. Generally, the conductance sensor 154 relies on the ionic molecules in the particular concentrate as conductors. Additionally, a range of acceptable levels of conductance (concentrate) can be set for a particular type of beverage. The pre-determined range and the variability of the concentrate mixed with the water stream helps accommodate variations in batches of concentrate regardless of whether the concentrate is in a prepared liquid form, fresh prepared liquid form, powdered form, or other form. While the variability of the substance used to prepare the concentrate may change from batch to batch or the processing techniques may vary slightly based on manufacturing tolerances of the concentrate, the adjustments resulting from the present system helps assure a consistent resultant beverage.

The feedback device 150 accommodates ranges for several variables. For example, the feedback device 150 can be adjusted to take into account the temperature of the substance. In this regard, when a conductance sensor 154 is used as the feedback, conductivity is generally consistent at elevated temperatures whereas conductivity tends to be reduced with a decrease in temperature. A control can be provided on the controller 158 or the conductivity sensing circuit 164 to adjust the range upwardly or downwardly. This may be used to adjust the feedback device 150 for regional tastes, for example, to make a batch of juice stronger or weaker. However, the control may also be limited to a specific desired range while still providing adjustment within that range upwardly or downwardly. As an additional consideration, the conductivity sensing circuit 164 senses AC conductance. AC conductance is used in order to prevent plating of the molecules on the electrodes 166, 168. Also, a triac is used to change energy to the solenoid 130a to control the gate device 128a to control the flow therethrough.

The feedback device 150 can be used to sense an empty dispenser condition. For example, if the conductance sensor 154 senses a dramatic change in conductance, this would tend to indicate either the absence of concentrate in the dispenser 22 or a blockage preventing concentrate from entering the blending chamber 162. In either situation, this condition can be identified to the user whereby troubleshooting can occur to solve the problem. Furthermore, in a highly automated system, the low or no concentrate signal sensed by the feedback device 150 can be used to initiate a refill cycle whereby concentrate stock can be dispensed from a corresponding brewer (not shown) coupled to the controller 158.

Figure 9:
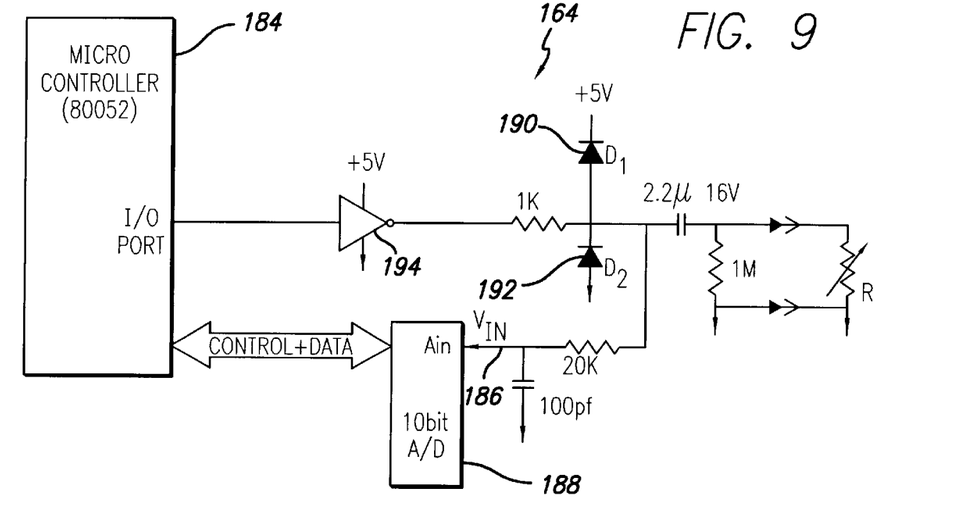
FIG. 9 is a diagrammatic illustration of an example of a concentrate system of the invention.
Figure 10:
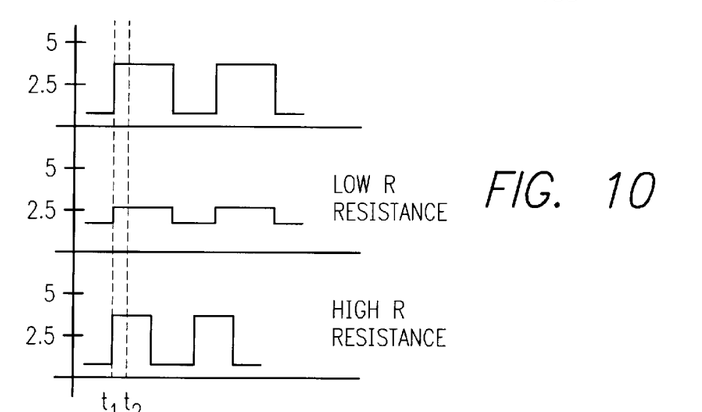
FIG. 10 is a chart of signal waveforms of conductance sensor operation.

With reference to the circuit of FIGS. 9 and 10, a portion of the sensing circuit 164 is shown. As generally shown, the micro controller 184 outputs a square wave which makes position transition at t1. The analog to digital input voltage 186 fed to the analog to digital converter 188 is read at t2. The conductance of the portion of the resultant beverage in the sensing chamber 190 at a given time interval is related to the analog to digital reading. The conductance is detected and the measurement is used in determining whether to accelerate or decelerate the speed of the peristaltic pump 38 and the gate device 128a. It should be noted that the average current is zero in order to eliminate buildup on the electrodes 166, 168. The lower sensing electrode 168 is generally connected to circuit ground and earth ground such that any external surface contacted by the delivered beverage will not affect the conductance reading of the conductance sensor 154. The effective parallel conductance of the line from the gate device 128a is not significant due to its length and small cross-section; the effective parallel conductance of the water from the water line is not significant due to the relatively low conductance of water. This is consistent with the use of AC to prevent plating. It should also be noted that diodes 190, 192 are provided to protect the gate device 194 and input to the analog to digital converter 188. The schematic of FIG. 9 and examples of wave forms in FIG. 10 show how the micro controller 184 and the analog to digital converter 188 can rapidly determine a conductance reading with no DC current through the conductance sensor 154. The reading or measurement is used, for example, to determine the concentration of juice components in a blended beverage.

The measured conductivity is based on the peak reading among several readings taken over an interval which includes individual analog to digital readings at consecutive "t2" events; this further ensures that the occasional air bubble will not introduce confusing control responses.

The control algorithm implements an integrating response with variable gain, such that the rate at which the drive of the peristaltic pump 38 and the gate device 128a responds to a measured error in conductivity is set to not over-react to normal variations in measured conductivity, such as might occur with the introduction of an occasional air bubble into the sensing chamber 190.

The user can adjust the delivered beverage strength with a simple control (e.g. rotary control knob) connected to the controller 164 which adjusts the target to which the closed-loop control adjusts average conductance readings.

The generally cylindrical electrodes 166, 168 also include a tapered section so as to generate a degree of mixing turbulence in the blending chamber 162 as the water and the concentrate are mixed therein. The tapered section tends to inhibit the introduction of air bubbles into the sensing chamber 190 between electrodes 166 and 168, which would have confounded the accurate sensing of the conductance of the blended liquid beverage. The turbulence restricts the outflow of the blended beverage through the exit port. This produces a degree of buildup in the blending chamber 162. The mixing and blending of the concentrate with the water helps assure that it is thoroughly mixed. This is important for an accurate reading for insuring that the sensing chamber 190 is full of liquid when sensing conductivity and that the concentrate and water are thoroughly mixed together to prevent striation or Layering. A partially full conductivity chamber Sight result in an inaccurate reading as well as striation creating inconsistent reading. The controller 158 is programmed with a brief delay (for example, one second) when the dispensing cycle is initiated. The brief delay insures that the sensing chamber 190 is full of liquid before measurements are taken. This helps to assure that the feedback device 150 does not overreact to the initial, perhaps inconsistent, mixture of beverage Which is used to fill the sensing chamber 190.

With further reference to FIG. 8, a columnating device 196 is provided in the electrode 168 proximate to the exit port. The columnating device 196 helps to reduce the swirling and turbulence which might otherwise be present at the exit port. By columnating and directing the flow in a generally vertical direction, the potential for splashing at the exit port is minimized or prevented. The columnating device 196 as shown in FIG. 8 is generally multi-vaned device. It should be noted that a single blade device such as in taught in U.S. Pat. No. 5,423,245 could be used for this purpose as well.

Near the completion of the dispensing cycle, dispensing of the concentrate is ceased and a small quantity of hot water is used to rinse the dilution assembly 152. By rinsing at the end of the dilution cycle, the dilution assembly 152 can be kept clean and sanitary thereby further improving the efficiency of the invention.

Now that the specifics of the structure of the system 20 has been described, the operation of the system 20 is described. The operation of the system 20 is described with regard to pumping and dispensing a first type of juice, such as orange juice, with reference to FIGS. 1–6, as described above and further with reference to FIG. 7.

Under control of the controller 158, the rotor assembly 60 is driven to rotate the plates 68, 70, the rods 82 and the rollers 80. This causes the rollers 80 to roll over the tube 134 which is stationary relative to the rotor assembly 60 and the band 62 or band 62' as the tube 134 is anchored to the wall 44 at the aperture 56. As the rollers 80 roll over the tube 134, the tube 134 is compressed or occluded at the points where the rollers 80 compress the tube 13A, against the band 62 or band 62'. Compression of the tube 134 and rotation of the rotor assembly 60 creates a peristaltic action forcing the substance through the tube 134 to pass the substance along the length of the tube 134. The movement of the substance through the tube 134 induced by the peristaltic pump 38 creates a vacuum within the portion of the tube 134 upstream from the peristaltic pump 38. The vacuum draws the substance from the reservoir 22 and into the tube 134. The rotor assembly 60 uses four rollers to create a smaller and more precise pulse. The spool-shaped or spindled shape of the roller 80 positions the tube 134 therein. The rollers 80 are formed of a material which has a coefficient of friction that is compatible with the material of the tube 134 so that the rollers 80 roll easily over the tube 134 and do not bind with the tube 134. The speed of rotation of the peristaltic pump 38 is controlled by the controller 158 in response to the conductivity of the resulting beverage as described herein.

The concentrate exits the peristaltic pump 38 and flows along one of the portions, for example portion 134b, and then through the associated gate device 124b which is open. Because the gate device 124a through which portion 134a is closed, concentrate cannot flow therethrough. Opening and closing of the gate devices 124a, 124b are controlled by the controller 158 in response to the conductivity of the resulting beverage as described herein. The gate devices 124a, 124b can be pulsed (opened and closed rapidly) at a different rate than the rate of rotation of the rotor assembly 60 to refine the substance stream. That is, the gate device 124b is pulsed to make the substance stream appear to have a continuous rate of flow. Also, the gate device 124b is used as a variable orifice to fine tune the actual flow rate.

The band 62 or band 62' forms the outer occlusion wall against which the rotor assembly 60 acts. As described above, the flexible nature of the band 62 or band 62' and the spring 120 allows for the peristaltic pump 38 to maintain accurate metering over a wider range of applications, with less torque and tube wear than the typical peristaltic pump. In addition, the band 62 or band 62' conforms to the pattern of the rollers 80 to maintain a generally consistent occlusion pressure; eliminates over occlusion of the tube 134 to account for manufacturing tolerances (e.g. roller diameters and concentricity, outer occlusion wall diameter and concentricity, tubing wall thickness, etc.); allows for multiple tube sizes to be used with one peristaltic pump 38. The adjusting means 64 can be adjusted to a variety of positions to precisely control the occlusion force, and thus the maximum pressure that can be generated inside the tube 134. For example, if the tube 134 becomes blocked downstream of the peristaltic pump 38, such as would occur if the gate device 124b malfunctions, the band 62 or band 62' moves away from the rotor assembly 60 such that concentrate is not being forced in the downstream direction. That is, when excessive amount of concentrate builds up in the tube 134, the band 62 or band 62' will move far enough away from the rotor assembly 60 in this situation to prevent further pumping action on the liquid and to reduce the risk of rupturing the tube 134.

As discussed, the spring 120 generates a generally consistent occlusion force, that can be adjusted to a desired tension. When the tension of the spring 120 is increased, the occlusion force on the tube 134 is increased and which is useful to enhance the ability of the peristaltic pump 38 to meter thick, viscous products, to pump against higher pressures, and to generate a higher vacuum. When the tension of the spring 120 is decreased, the occlusion pressure on the tube 134 is decreased and this reduces operating torque of the peristaltic pump 38, and reduces wear on the tube 134. The spring 120 can also be adjusted to set the maximum pressure the peristaltic pump 38 will generate. This setting of the maximum pressure the peristaltic pump 60 will generate allows the outlet of the peristaltic pump 38 to be dead-headed without damaging the tube 134, allows for accurate variable orifice metering of the concentrate being pumped, and allows the output to be regulated so as to eliminate the pulsing effect common to peristaltic pumps.

In the preferred embodiment, the concentrate dispensers 22, 22' dispense a liquid or solid concentrate, as well as any other form of concentrate which might be applicable in the preparation of substances, such as a beverage, and for example juice. However, it should be appreciated that other substances or foods might also be prepared using this system 20 and its structures and such systems are fully included within the scope of the present invention. Moreover, the description in the present application is directed to a diluted substance dispenser which uses hot water. However, it should be appreciated that other substances may be used to dilute the concentrate such as carbonated water, milk products, or other substances. Additionally, the present application also includes other devices which may be preferable or necessary to combine the concentrate and the dilution substance. For example, mechanical agitators, heaters, or coolers should be fully considered as contemplated in the present invention.

While preferred embodiments of the present invention are shown and described, it is envisioned that those skilled in the art may devise various modifications of the present invention without departing from the spirit and scope of the appended claims.

The invention claimed is:

1. A peristaltic pump for providing a peristaltic pumping action on a tube comprising:
   a housing;
   a rotor assembly rotatably attached to said housing;
   a flexible band attached to said housing and at least partially surrounding a portion of said rotor assembly; and
   said tube being positioned between at least a portion of said rotor and a generally corresponding portion of said flexible band.

2. A peristaltic pump for providing a peristaltic pumping action on a tube comprising:
   a housing;
   a rotor assembly rotatably attached to said housing, said rotor assembly including at least one roller;
   a flexible band attached to said housing and at least partially surrounding a portion of said rotor assembly;
   said tube being positioned between at least a portion of said rotor and a generally corresponding portion of said flexible band; and
   means for adjusting the position of said flexible band relative to said rotor assembly.

3. A peristaltic pump as defined in claim 2, wherein said flexible band has opposite ends, one said end being pivotally attached to said housing, and the other end being coupled to said position adjusting means.

4. A peristaltic pump as defined in claim 3, wherein said position adjusting means comprises a threaded member, said threaded member having a head and a threaded shank, said shank being attached to said housing, said band end being coupled to said shank, and a spring positioned between said band end and said head.

5. A peristaltic pump as defined in claim 2, wherein said position adjusting means comprises a threaded member, said threaded member having a head and a threaded shank, said shank being attached to said housing, said band being coupled to said shank, and a spring positioned between said band and said head.

6. A peristaltic pump as defined in claim 1, wherein said band is formed of a material having semi-rigid characteristics.

7. A peristaltic pump as defined in claim 1, wherein said band has at least one stiffening rib thereon.

8. A peristaltic pump as defined in claim 1, wherein said rotor assembly includes at least one roller which is spool-shaped.

9. A peristaltic pump as defined in claim 1, wherein said rotor assembly includes a pair of plates with at least one roller mounted therebetween, said at least one roller including a pair of outer portions, a cylindrical central portion between said outer portions, and end portion provided on an outer surface of each said outer portion, said end portions engaging said respective plates and wherein said at least one roller is rotatable mounted between said plates and wherein said each outer portion has a predetermined diameter which is greater than a predetermined diameter of said central portion, and said end portion has a predetermined diameter which is less than the diameter of said outer portion and less than the diameter of said central portion and wherein said outer portion has an inner curved surface which smoothly transitions with a curved surface between said central portion and said respective outer portion.

10. A peristaltic pump for providing a peristaltic pumping action on a tube comprising:
    a housing;
    a rotor assembly rotatably attached to said housing, said rotor assembly including at least one roller;
    a flexible band attached to said housing and at least partially surrounding a portion of said rotor assembly; and
    means for adjusting the position of said flexible band relative to said rotor assembly.

11. A peristaltic pump as defined in claim 10, wherein said rotor assembly includes a pair of plates with at least one roller mounted therebetween, said at least one roller including a pair of outer portions, a cylindrical central portion between said outer portions, and end portion provided on an outer surface of each said outer portion, said end portions engaging said respective plates and wherein said at least one roller is rotatably mounted between said plates and wherein said each outer portion has a predetermined diameter which is greater than a predetermined diameter of said central portion, and said end portion has a predetermined diameter which is less than the diameter of said outer portion and less than the diameter of said central portion and wherein said outer portion has an inner curved surface which smoothly transitions with a curved surface between said central portion and said respective outer portion.

12. A method of pumping using a peristaltic pump, said pump including a housing, a rotor assembly rotatably positioned on said housing, a flexible band attached to said housing and at least partially surrounding a portion of said rotor assembly, said method comprising the steps of:

positioning a tube between at least a portion of said rotor assembly and a generally corresponding portion of said flexible band;

rotating said rotor assembly to progressively occlude said tube between said rotor assembly and said flexible band; and advancing liquid through said tube with said progressive occlusion of said tube.

13. A method of pumping as recited in claim 12, said including means for adjusting the position of said flexible band relative to said rotor assembly, said method further comprising the step of adjusting said adjustment means to controllably adjust the spacing between said flexible band and said rotor assembly to controllably adjust the occlusion forces on said tube positioned therebetween.

* * * * *